US011691873B2

(12) United States Patent
Kann (10) Patent No.: US 11,691,873 B2
(45) Date of Patent: Jul. 4, 2023

(54) COMPOSITIONS AND METHODS OF USING FINE MINERAL MATTER AS A CATALYST FOR CHEMICAL RECYCLING

(71) Applicant: Radical Plastics, Inc., Marblehead, MA (US)

(72) Inventor: Yelena Kann, Marblehead, MA (US)

(73) Assignee: Radical Plastics Inc., Marblehead, MA (US)

( * ) Notice: Subject to any disclaimer, the term of this patent is extended or adjusted under 35 U.S.C. 154(b) by 0 days.

(21) Appl. No.: 17/084,441

(22) Filed: Oct. 29, 2020

(65) Prior Publication Data

US 2021/0122630 A1 Apr. 29, 2021

Related U.S. Application Data

(60) Provisional application No. 62/927,493, filed on Oct. 29, 2019.

(51) Int. Cl.
*C01B 3/32* (2006.01)
*C01B 3/36* (2006.01)
(Continued)

(52) U.S. Cl.
CPC .......... *C01B 3/326* (2013.01); *B01J 23/8898* (2013.01); *C01B 3/36* (2013.01); *C01B 3/382* (2013.01);
(Continued)

(58) Field of Classification Search
CPC C01B 3/326; C01B 3/36; C01B 3/382; C01B 3/44; C01B 2203/0233;
(Continued)

(56) References Cited

U.S. PATENT DOCUMENTS 8,449,650 B2 * 5/2013 Currier .............. B01D 53/0438
96/99
2008/0081844 A1 * 4/2008 Shires ...................... C10K 1/20
518/703
(Continued)

FOREIGN PATENT DOCUMENTS

WO 2016/172240 A1 10/2016
WO 2019/190711 A1 10/2019

OTHER PUBLICATIONS

Brems et al. "Gasification of plastic waste as waste-to-energy or waste-to-syngas recovery route" Natural Science 5 (2013) 695-704 (Year: 2013).*

(Continued)

*Primary Examiner* — Steven J Bos
*Assistant Examiner* — Syed T Iqbal
(74) *Attorney, Agent, or Firm* — Nutter McClenen & Fish (57) ABSTRACT

The presently disclosed embodiments relate to the utilization of coal-derived fine mineral matter in chemical recycling of plastics or of solid mixed plastic waste. The instantly disclosed mineral based catalyst benefits the processes of catalytic cracking, gasification and steam reforming to maximize carbon utilization and production of plastics of original quality from recycled or renewable feedstocks while reducing the plastic pollution in the environment. The catalyst can be based on inorganic fine mineral matter, a natural ancient mineral mixture found in coal deposits and containing a plurality of transition metals, such as iron, copper, and manganese, as well as calcium, barium, magnesium, potassium, sodium, which can act as co-catalysts. Addition of the catalyst can convert plastic to syngas at a faction of the energy of conventional technologies.

18 Claims, 3 Drawing Sheets

(51) Int. Cl.
  *C01B 3/44*   (2006.01)
  *C10G 9/36*   (2006.01)
  *C10G 47/02*   (2006.01)
  *C01B 3/38*   (2006.01)
  *B01J 23/889*  (2006.01)
  *C10G 47/30*   (2006.01)

(52) U.S. Cl.
  CPC .............. *C01B 3/44* (2013.01); *C10G 9/36* (2013.01); *C10G 47/02* (2013.01); *C10G 47/30* (2013.01); *C01B 2203/0233* (2013.01)

(58) Field of Classification Search
  CPC .... C01B 2203/0261; C01B 2203/0277; C01B 2203/061; C01B 2203/1252; B01J 23/8898; B01J 23/76; B01J 23/94; B01J 35/023; B01J 38/00; B01J 38/02; C10G 9/36; C10G 47/02; C10G 47/30; C10J 2300/0946; C10J 2300/0986; C10J 3/463; C10J 3/466; C10J 3/66; Y02P 20/52; Y02P 20/584
  See application file for complete search history.

(56) References Cited

U.S. PATENT DOCUMENTS

| | | | | |
|---|---|---|---|---|
| 2009/0014689 | A1* | 1/2009 | Klepper | C10K 1/101 422/198 |
| 2013/0090393 | A1* | 4/2013 | Bracht | C07C 1/0485 518/702 |
| 2014/0250858 | A1* | 9/2014 | Mazumdar | C10J 3/721 48/89 |
| 2016/0311728 | A1 | 10/2016 | Swensen et al. | |

OTHER PUBLICATIONS

Brems, et al., "Gasification of plastic waste as waste-to-energy or waste-to-syngas recovery route" Natural Science vol. 5, 2013, pp. 695-704.

International Search Report and Written Opinion for International Application No. PCT/US2020/058036 dated Jan. 28, 2021 (16 pages).

Albertsson et al., "Degradation product pattern and morphology changes as means to differentiate abiotically and biotically aged degradable polyethylene", Polymer, vol. 36, No. 16, 1995, pp. 3075-3083.

Arnaud et al., "Photooxidation and biodegradation of commercial photodegradable polyethylenes", Polymer Degradation and Stability 46 (1994), pp. 211-224.

Barthelmy, D. Mineralogy Database. Last edited Sep. 5, 2012. Retrieved from the Internet under http://www.webmineral.com/ on Nov. 10, 2020 (2 pages).

Billingham et al., "Environmentally Degradable Plastics Based on OXO-Biodegradation of Conventional Polyolefins", Springer US 2003, Univ. of Sussex, Brighton, BN1 9QJ, UK, and EPI Ltd., Unit 7, Dunstan Place, Dunstan Rd., Chesterfield, Derbyshire, S41 8NL, UK (10 pages).

Chandra et al., Department of Polymer Technology and Applied Chemistry, Delhi College of Engineering, Delhi-110006, India, "Biodegradable Polymers", Prog. Polym. Sci., vol. 23, 1998, pp. 1273-1335.

Chiellini et al., "Biodegradation of thermally-oxidized, fragmented low-density polyethylenes", Polymer Degradation and Stability 81(2), 2003, pp. 341-351.

Eletskii et al., "Catalytic Steam Cracking of Heavy Oil Feedstocks: A Review," Catalysis in Industry, vol. 10, No. 3, 2018, pp. 185-201.

Gao, J., "Coal, Oil Shale, Natural Bitumen, Heavy Oil and Peat—vol. I—Coal, Oil Shale, Natural Bitumen, Heavy Oil, and Peat", College of Resource and Environment Engineering, East China University of Science and Technology, Shanghai, China, © Encyclopedia of Life Support Systems (EOLSS) (1996).

Geyer et al., "Production, use and fate of all plastics ever made," Science Advances 3 (7), e1700782, Jul. 19, 2017 (5 pages).

Gonzalez-Guerrero et al.,"Transition Metal Transport in Plants and Associated Endosymbionts: Arbuscular Mycorrhizal Fungi and Rhizobia", Frontiers in Plant Science, Jul. 2016, vol. 7, Article 1088 (22 pages).

Guin, et al., "Further Studies of the Catalytic Activity of Coal Minerals in Coal Liquefaction. 1. Verification of Catalytic Activity of Mineral Matter by Model Compound Studies" Ind. Engl. Chem. Process Des. Dev., vol. 18, No. 3, 1979, pp. 371-376.

Halley et al., "Developing Biodegradable Mulch Films from Starch-Based Polymers,"Starch/Starke 53, 2001, pp. 362-367.

Jakubowicz, I., "Evaluation of degradability of biodegradable polyethylene (PE)", Polymer Degradation and Stability 80 (2003) pp. 39-43.

Kasirajan et al., "Polyethylene and biodegradable mulches for agricultural applications: a review", Agron. Sustain. Dev. (2012) 32, pp. 501-529.

La Revue De L'Institut Veolia Facts Reports, 2019, pp. 62-74.

Miles et al., "Searching for Alternatives to Plastic Mulch", WSU Vancouver Research and Extension Unit, 1919 NE 78th Street, Vancouver, Washington; 2005; tel # (360) 576-6030, 2005, milesc@wsu.edu, http://agsyst.wsu.edu (7 pages).

Ragaert, et al., "Mechanical and chemical recycling of solid plastic waste," Waste Management, vol. 69, 2017, pp. 24-58.

Scott, G., "'Green' Polymers", Polymer Degradation and Stability 68 (2000) pp. 1-7.

U.S. Department of Agriculture. 2009. Summary Report: 2007 National Resources Inventory, Natural Resources Conservation Service, Washington, DC, and Center for Survey Statistics and Methodology, Iowa State University, Ames, Iowa. 123 pages.

Warnick et al., "Weed suppression with hydramulch, a biodegradable liquid paper mulch in development", Renewable Agriculture and Food Systems: 21(4); 2006, pp. 216-233.

* cited by examiner

COMPOSITIONS AND METHODS OF USING FINE MINERAL MATTER AS A CATALYST FOR CHEMICAL RECYCLING

CROSS-REFERENCE TO RELATED APPLICATIONS

The present disclosure claims priority to U.S. Provisional Application No. 62/927,493, entitled "Coal-derived fine mineral matter as a catalyst for the chemical recycling of plastics, mixed plastic solid waste and heavy oil feedstocks," which was filed on Oct. 29, 2019, and which is incorporated by reference herein in its entirety.

FIELD

Various embodiments of the present disclosure generally relate to the utilization of fine mineral matter, e.g., coal derived fine mineral matter, in chemical recycling of plastics and/or solid mixed plastic waste, and more specifically relate to the recycling of waste and heavy oil feedstocks in the presence of a mineral matter-based catalyst that accelerates the efficiency of recycling during the processes of catalytic cracking, gasification and steam reforming.

BACKGROUND

The synthetic plastics industry has been one of the great industrial successes of the last 50 years. For example, production of plastics has surged from 15 million metric tons in 1964 to 311 million tons in 2014, and is expected to double again over the next 20 years, with new uses and applications of plastics being implemented annually. With the increase in the prevalence of plastics in the marketplace, an unintended consequence of this widespread plastic use is a proportional and rapid increase of plastic wastes and litter. It has been estimated that the amount of plastics that end up in landfills worldwide is almost half of the annual production, which amounts to more than 150 million tons annually. In turn, waste disposal becomes problematic due to the costs and availability of landfilling, toxicity of incineration and limited amount of cycles that mechanical recycling can support.

Conventional recycling processes have several shortcomings that prevent their scalability and widespread use to combat the increased prevalence of plastic use in the industry. Current recycling processes lack the ability to treat a wide variety of plastic wastes, which leaves no choice but to landfill the remaining waste. For waste that can be recycled and treated, products made therefrom generally are of lesser quality than the original compounds, resulting in less desirable products and shorter lifecycle. For example, this makes it more likely to go to landfill.

SUMMARY

In accordance with one embodiment of the invention, a chemical recycling method includes obtaining an amount of catalytic fine mineral matter derived from coal and/or mined from natural resources including volcanic basalt, glacial rock dust deposits, iron potassium silicate and/or sea shore deposits with particle sizes ranging from less than about 50 μm to about 2 μm; and contacting a molten polymer or its vapors with the catalytic fine mineral matter at a cracking or gasification temperature in the presence of oxygen and/or steam to form the syngas product.

The syngas product can include one or more of $H_2$, CO, $CH_4$, $CO_2$, $H_2O$, and inert gases. The catalytic fine mineral matter includes at least one transition metal selected from the group consisting of Fe, Cu, Mn, Mo, Zn, Co, or combinations thereof at the following concentrations: Fe 14,000 to 45,000 ppm; Cu 10 to 50 ppm; Mn 100 to 700 ppm; Mo 1 to 2 ppm; Zn 20 to 120 ppm; and Co 10 to 15 ppm, where ppm are measured with ICP-AES method utilizing nitric acid, hydrochloric acid and hydrogen peroxide in a heated digester. In some embodiments, the catalytic fine mineral matter includes alkali and alkaline earth metals Ca, K, Na, Mg or combinations thereof at the following concentrations: Ca 1,000 to 18,000 ppm; K 600 to 4,000 ppm; Na 300 to 1,500 ppm; and Mg 20 to 8,000 ppm. The catalytic fine mineral matter can be utilized as either a support material or the catalyst. The concentration of the catalytic fine mineral matter can be between 0.5 and 8 volume % or at a catalyst/feedstock ratio in a range of about 1:5 to about 1:100 wt %. In some embodiments, the particle size may range from between approximately 5 microns and approximately 0.5 microns.

Among other ways, the molten polymer in the presently disclosed method may be produced following a catalytic process of post industrial or post-consumer plastic waste, of solid mixed plastic waste, or of petrochemical heavy oils and alkanes by steam cracking, gasification and reforming processes. The liquefaction precedes gasification, liquefaction being achieved via pyrolysis, thermal cracking, or steam cracking to convert plastic waste into synthetic heavy oil and condensable gases that are injected onto the gasifier and/or steam reforming. The method also may include cleaning and/or hydrogenation following gasification to improve the composition of the syngas product. In some embodiments, the method may subject the syngas to one or more of a KDV process, a Texaco process, or processes utilizing single or dual bed fluidized, fixed and entrained flow reactors.

In some embodiments, the steam cracking may include aquathermolysis in supercritical water. The reforming process may include catalytic steam reforming of methane to the syngas product. The syngas product may be used as a heat source to power the stream cracking or gasification, or may be used as a gas source to support hydrocracking. The heating may be conducted at a temperature in a range from about 200 degrees Celsius to about 500 degrees Celsius. In some embodiments, the method may further include electrifying the syngas product. The catalytic steam cracking could be in the batch or continuous flow mode (slurry type).

BRIEF DESCRIPTION OF THE FIGURES

This disclosure will be more fully understood from the following detailed description taken in conjunction with the accompanying drawings, in which.

DETAILED DESCRIPTION

Certain exemplary embodiments will now be described to provide an overall understanding of the principles of the structure, function, manufacture, and use of the systems, devices, and methods disclosed herein. One or more examples of these embodiments are illustrated in the accompanying drawings. Those skilled in the art will understand that the systems, devices, and methods specifically described herein and illustrated in the accompanying drawings are non-limiting exemplary embodiments and that the scope of the present disclosure is defined solely by the claims. The features illustrated or described in connection with one exemplary embodiment may be combined with the features of other embodiments. Such modifications and variations are intended to be included within the scope of the present disclosure. Moreover, one skilled in the art will recognize that the ranges disclosed in the present application are approximate and merely exemplary. The concentration ranges of the transition metals, promoters, and other compounds that make up the catalyst can vary within acceptable values In illustrative embodiments, coal-derived fine mineral matter is utilized in chemical recycling of plastics or of solid mixed plastic waste. The fine mineral matter can serve as a catalyst in the processes of catalytic cracking, gasification and steam reforming to lower the activation energy of thermal degradation of polyethylene (PE) feedstock in the presence of the mineral that is in the scope of the presently disclosed embodiments. Such technology can support the missions of maximizing carbon utilization and production of plastics of original quality from recycled or renewable feedstocks while reducing the plastic pollution in the environment. For example, the instantly disclosed compositions and methods can be used to treat any type of plastic waste (PW), whether sorted or unsorted, and produce plastics of the same quality. Such techniques would enable transition of the waste plastic into the feedstock for new plastics, rather than combusting the plastic for energy recovery or landfilling. In some embodiments, the fine mineral matter of the instantly disclosed embodiments can be utilized as a support material for the processes discussed in greater detail below.

In an exemplary embodiment, chemical recycling can be used to produce unlimited recycling of any plastic material (mixed or sorted), where the focus is on recovering the building blocks of the plastic materials. Chemical recycling has a great potential for heterogeneous and contaminated plastic waste material if separation is neither economical nor technically feasible. Chemical recycling can be used in closed-loop recycling, which converts polymers into smaller molecules which are then repurposed into the same product they were recovered from originally, or open-loop recycling, in which those smaller molecules are repurposed into different products. Chemical recycling has the effect of reducing plastic pollution in the environment, while allowing for the transfer of the value of original materials to the next generation products, reducing the consumption of fossil feedstock (stored carbon), and reducing the associated with fossil feedstock GHG emissions.

The routes of chemical recycling can be roughly divided into thermochemical and catalytic conversion, which include steam cracking, pyrolysis, gasification, fluid catalyzed cracking, hydrocracking, among others. The processes of cracking, gasification and steam reforming can be successfully catalyzed and can be conducted in the presence of air or oxygen or steam. These techniques would be of particular interest to polyolefins, polymers very sensitive to oxidative thermal degradation and representing over 60% of generated plastic waste. Many other polymer types would be also very sensitive to the catalytic oxidative cracking, gasification and reforming, especially in the presence of steam or supercritical water. Some non-limiting examples of polymers to which the presently disclosed composition and methods can be applied can include acrylics, styrenics, vinyls, polyesters, polyethers, polycarbonates, polyurethanes, polyamides, polyimides, cellulose based plastics, combinations and copolymers of the above.

A person skilled in the art will recognize that traditional technology for the production of monomers, mostly olefins, is based on direct thermal cracking of naphtha/alkanes. During the cracking, part of the feedstock is converted into by-products that are not usable in the direct synthesis of plastics: 40-60% are hydrocarbons other than olefins, 4-25% is methane, and up to 10% benzene. Steam is typically used for the reduction of partial pressure of hydrocarbons. In the presence of oxygen-containing molecules in the cracker, carbon oxides ($CO$, $CO_2$) and hydrogen can also be generated via steam reforming and gasification.

When the feedstock is mixed plastic waste, it is expected that more methane will be produced. In order to achieve 100% carbon recovery, additional processes such as steam reforming of hydrocarbons to $CO$ and $H_2$, and combustion of the feedstock to cover part of the heat demand and to recover the carbon in the form of $CO_2$ (which also balances the $H_2/CO$ ratio of the syngas) can be performed. For the combustion process, $O_2$ could be generated via electrolysis of water (oxy-combustion). The routes of combustion and electrolysis and steam reforming are much less fuel-dependent than direct steam cracking of the feedstock to monomers.

In some embodiments, catalyzed thermal cracking of plastic wastes can be performed in a fluidized bed reactor. For example, in catalyzed thermal cracking, catalysts and sorbents can be introduced in the form of bed material. In some embodiments, a dual fluidized bed (DFB) can be used to separate the heat generation section (combustion) from the cracking section. As compared with a single fluidized bed reactor, the DFB configuration provides the additional advantages of diluting the cracking products only with steam (and not with flue gases) and regeneration of catalyst from the carbon deposits in the separate combustion section. The introduction of catalytic bed materials into the fluidized bed reactors can occur during the pyrolysis step or in a secondary step of steam reforming of the pyrolysis products.

The steam cracking described above produces liquefied feedstock, a portion of which could be then sent to gasification reactor to produce the syngas, which is a combination of hydrogen and carbon monoxide. Hydrogenation could be also utilized to remove sulfur impurities at the end of the gasification process. Syngas produced by gasification could be used in the production of petroleum-like products via the FTS (Fischer-Tropsch synthesis) or via methanol and DME (dimethyl either) synthesis followed by MTG (methanol-to-gasoline) or MTO (methanol-to-olefin) conversions, as discussed further below. Methanol is one of the largest produced chemicals in the world as it is used as reactant for the production of several commodity chemicals, e.g. formaldehyde, acetic acid, methyl amine. Syngas could be also used as a heat source to power the stream cracking or a gas source to support hydrocracking.

The use of the catalytic steam cracking can lead to liquid products having lighter composition and reduce coke formation due to the selective low temperature steam reforming (LTSR) of polyaromatic hydrocarbons (coke precursors). The additional hydrogen formed in situ both as a result of LTSR and water gas reaction can also participate in the upgrade due to the saturation of hydrocarbon radicals formed in catalytic steam cracking. To increase efficiency and effective of catalytic steam cracking, active and selective catalysts that are stable in the heavy oil feedstock and water environment can be used, as described in greater detail below. The catalytic steam cracking can be in a batch or a continuous flow mode with a fixed catalyst bed and a slurry. In the batch mode, a dispersed catalyst is currently based on Mo-, Ni-, Fe-compounds. Specifically, the use of Fe-containing dispersed catalyst leads to a decreased coking, which is explained by Petr Yeletsky et al in "Catalytic steam cracking of heavy oil feedstocks", *Catalyst in Industry*, 2018, vol 10, No. 3, pp 185-201, by the ability of iron salts to promote the hydrogen transfer from the hydrocarbon molecules saturated with hydrogen to the newly formed hydrocarbon radicals and the electron transfer between the organic components due to a possible change in oxidation state. The hydrogen transfer $Fe^{2+}$ to $Fe^{3+}$ leads to saturation of hydrocarbon radicals and the ability of $Fe^{3+}$ to be reduced to $Fe^{2+}$ can lead to improved stability of hydrocarbon radicals, making it less liable to be involved in polycondensation. Heterogeneous supported catalysts, e.g. red mud modified with $ZrO_2$, can be used in the batch mode. In the continuous flow mode, the catalytic steam cracking can be complicated by the hydrodynamic resistance of the catalyst bed and fast deactivation of the catalyst (due to its poisoning or coking). To prevent this, the slurry type reactors use a dispersed catalyst as disclosed in the present embodiments and, in some embodiments, include the addition of aromatic solvents. Iron compounds, e.g. hematites reduced into magnetite, can be beneficial in this approach (based on their redox chemistry described above).

In some embodiments, a composition of the instantly disclosed catalyst can be based on one or more of inorganic fine mineral matter, a natural ancient mineral mixture found in coal deposits and containing a plurality of transition metals, such as iron, copper, and manganese. The catalyst can also contain one or more of calcium, barium, magnesium, potassium, sodium which can act as co-catalysts. One exemplary embodiment of a composition of the catalyst can be: 30,100 ppm of Iron, 17,600 ppm Calcium, 5,190 Magnesium, 2,980 Potassium, 1,920 Sulfur, 1,190 Nitrogen, 253 ppm Manganese, 139 ppm Phosphorous, 93 ppm Zinc, 43 ppm Copper, 2 ppm Molybdenum. The bulk mineralogy analysis (XRD, XRF) of the fine mineral matter making up such a catalyst is presented in the Table 1 below:

TABLE 1

| Mineral* | Examples of Chemical formula | Weight ranges, % |
| --- | --- | --- |
| Mica/Illite | $(K,Na,Ca)(Al,Mg,Fe)_2(Si,Al)_4O_{10}(OH,F)_2$ | 5-45 |
| Kaolinite | $Al_2SiO_2(OH)_4$ | 3-35 |
| Chlorite | $(Mg,Fe,Al)_6(Si,Al)_4O_{10}(OH)$ | 3-20 |
| Smectite | $M_{0.33}H_2OAl_{1.67}(Fe^{2+},Mg^{2+})_{0.33}Si_4O_{10}(OH)_2$, where M is metal cation | 0-30 |
| Quartz | $SiO_2$ | 5-30 |
| Calcite | $CaCO_3$ | 0-5 |
| K-feldspar | $KAlSi_3O_8$ | 0-5 |
| Plagioclase feldspar | $NaAlSi_3O_8$—$CaAl_2Si_2O_8$ | 0-20 |

TABLE 1-continued

| Mineral* | Examples of Chemical formula | Weight ranges, % |
| --- | --- | --- |
| Pyrite | $FeS_2$ | <5 |
| Clinoptilolite | $(Na,K,Ca)_{2-3}Al_3(Al,Si)_2Si_{13}O \cdot 12H_2O$ | 0-5 |
| Jarosite | $KFe^{3+}_3(SO_4)_2(OH)_6$ | 0-10 |
| Magnetite | $Fe_3O_4$ | 0-10 |

In some embodiments, mineral oxides such as $Al_2O_3$, BaO, CaO, $Fe_2O_3$, MgO, $P_2O_5$, $K_2O$, $Na_2O$, $TiO_2$, $MnO_2$ can also be present in the composition of the fine mineral matter.

Some sedimentary clays that make up the fine mineral matter can include a porous structure and a water of hydration, similar to zeolite minerals, which can act as chemical catalysts. The porous structure of the fine mineral matter can accommodate a variety of cations ranging from $Ca^{2+}$, $Mg^{2+}$, $Na^+$, $K^+$, to $Fe^{2+}$, $Fe^{3+}$, $Cu^+$, $Cu^{2+}$, $Mn^{2+}$ and/or $Mn^{3+}$, which are loosely held and are readily available to be exchanged for others and to participate n electron transfer reactions.

Bonding in minerals listed in Table 1 could be of either ionic or covalent character, producing different arrangements, symmetries, electric charges and bonding characteristics. A ligand fields approach would be most applicable as it includes the ions or molecules surrounding the central atom or ion and the resulting strengths of ligand field would be a controlling factor. Charge transfer processes also occur in ligand field situations and can lead to a photochemical oxidation-reduction.

The fine mineral matter comprises at least one and more preferably at least two transition elements selected from the group consisting of Fe, Cu, Mn, Mo, Zn, and/or Co. The concentration of metals and metal salts within the fine mineral matter depends on the analytical method being used and is typically measured by X-ray techniques: fluorescence (XRF) and diffraction (XRD) and Inductively Coupled Plasma Acid Elemental Analysis (ICP-AES). These transition metals in the fine mineral matter have concentrations measured with the ICP-AES method utilizing nitric acid, hydrochloric acid and hydrogen peroxide in a heated digester and are defined in the range shown in Table 2:

TABLE 2

| Transition Metal | Concentrations Range in ppm |
| --- | --- |
| Fe | 14,000-45,000 |
| Cu | 10-50 |
| Mn | 100-700 |
| Mo | 1-2 |
| Zn | 20-120 |
| Co | 10-15 |

In some embodiments, the fine mineral matter further comprises a promoter that is an alkali/alkali earth metal. Some non-limiting examples of these promoters can include Ca, K, Mg or combinations thereof, to promote the oxidative degradation of plastics. The promoter in the fine mineral matter has concentrations defined in the range shown in Table 3. Other alkaline/alkaline earth containing minerals with similar fractions of soluble cations can also be used as promoters for oxidative degradation.

TABLE 3

| Promoter (Alkali/Alkali Earth Metal) | Concentrations Range in ppm |
|---|---|
| Ca | 1,000-18,000 |
| K | 600-4,000 |
| Mg | 20-8,000 |

The other elements identified by ICP-AES are presented in Table 4:

TABLE 4

| Element | ICP-AES, ppm |
|---|---|
| Aluminum | 5,000-20,000 |
| Barium | 100-800 |
| Beryllium | 0.9-1.1 |
| Boron | 5-17 |
| Chloride | 23-304 |
| Chromium | 14-28 |
| Fluoride | 3-5.6 |
| Nickel | <11 |
| Phosphorus | 100-300 |
| Selenium | ND |
| Silicon | 400-800 |
| Silver | ND |
| Sodium | 300-1000 |
| Sulfur | 1,500-3,300 |
| Tin | ND |
| Vanadium | 13-16 |

In some embodiments, the concentration of the catalytic fine mineral matter can depend on the reactor type. For example, in continuous fluidized bed reactors, the catalyst to feedstock ratios can range from about 1:5 to about 1:100 wt %, though in some embodiments, the range can be from about 1:10 to about 1:70 wt %. In batch-type reactors, the concentration of the catalyst can be in a range from about 0.5 to about 30 volume %, though in some embodiments, the range can be from about 0.5 to 8 volume %.

The fine mineral matter can be separated by froth flotation techniques, or similar processes known to one skilled in the art, and has particle sizes approximately ranging from less than about 50 μm to about 2 μm, though in some embodiments, the particle sizes can approximately range from approximately 0.5 to approximately 20 microns. In some embodiments, finer fractions can be used, such as between approximately 5 microns and approximately 0.5 microns, or between approximately 2 microns and approximately 0.5 microns.

The proposed catalyst accelerates the chain scission and the oxidative conversion of polymers, increases the yields of $CO$, $CO_2$ in the discussed above thermal catalytic cracking of petrochemical heavy oil feedstocks and/or alkanes, mixed plastic solid waste or post-industrial or post-consumer plastic waste. Transition metals compounds can participate in redox processes in media containing both hydrocarbons and water: the reduction with hydrocarbons of transition metals oxides (oxidative cracking) is followed by reoxidation with water, which be in the form of overheated steam or supercritical fluid. Hydrogen that formed in situ during the reoxidation of the reduced compounds can saturate liquid products and increase their quality.

The liquefaction product distribution can be affected by the presence of indigenous mineral matter, with raw coals giving higher benzene and pyridine soluble yields than demineralized coals. Under coal liquefaction conditions the hydrogen donor solvent (e.g. tetralin) donates its hydrogen to coal-derived free radicals (with naphthalene being the major product of the solvent dehydrogenation).

In the instantly disclosed embodiments, the free radicals that are generated from the heavy oil or mixed plastic feedstocks are not terminated with the hydrogen donating compounds, but rather participate in hydrogen abstraction promoting further chain unzipping of high molecular weight hydrocarbons in oxygen rich environments.

A person skilled in the art will recognize that higher process severity conditions (requiring high temperature and/or pressure) typically lead to higher fraction of aromatics. In the presence of the catalyst, for example, the severity could be minimized and the composition of the produced molecules could be made more uniform with a lower fraction of aromatics. Full conversion at lower temperatures can simplify the subsequent electrification, which in some embodiments, can be utilized in lieu of and/or in addition to combustion.

The use of the presently disclosed catalyst can promote partial oxidation, low temperature partial steam reforming, and catalytic cracking, significantly increasing the efficiency of the processes of cracking and steam reforming/gasification. Water can be used in a state of steam, superheated steam or supercritical fluid. The cracking involving supercritical water is highly effective in the presence of catalysts due to the supercritical water being almost non-polar and a good solvent for hydrocarbons, unlike ordinary water. The supercritical water can also disperse high molecular weight hydrocarbons that are not readily soluble and/or insoluble by forming emulsions, which leads to decreased yields of coke and increased yields of liquid products. The supercritical water can increase the efficiency of the oxidative cracking by promoting partial oxidation of hydrocarbons and leads to formation of additional hydrogen.

It will be appreciated that in some embodiments, the disclosed catalyst does not undergo pyrolysis. Rather, in some embodiments, the presently disclosed catalyst enables the processes of steam cracking, reforming and gasification to be conducted at reduced process severity conditions, i.e. temperatures, pressures, energy consumption. The catalyst is shown to reduce the activation energy of decomposition of polyolefin-based feedstock, when the decomposition is conducted in the oxidative environment, such as in air. TGA data demonstrates reduction of the activation energy of thermal degradation of PE feedstock in the presence of described mineral, as described further below. For example, in some embodiments, the activation energy can be reduced from 43 to 23 kJ/mol with about 2% of the fine mineral matter used.

The catalyst can work in both in situ and postgasification reactions. The former may involve impregnating the catalyst in the feedstock prior to gasification. It can be added directly in the reactor, as in a fluidized bed. In postgasification reactions, catalysts are placed in a secondary reactor downstream of the gasifier to convert the tar and methane formed (guard bed reactors), which has the additional advantage of being independent of the gasifier operating condition. The second reactor can be operated at temperatures optimum for the reforming reaction.

Some non-limiting examples of processes in which the instantly disclosed catalyst can be used and/or used to improve can include: (1) a KDV process (catalytic pressureless depolymerization process), (2) a Texaco process, which processes utilizing fluidized, fixed bed and entrained flow reactors, and (3) desulfurization of coal sulfur compounds with or without addition of other catalytic compounds.

Additional processes that can benefit from the instantly disclosed catalyst are summarized below:

Epoxidation of olefinic alcohols: the use of vanadium and molybdenum for the epoxidation of simple olefins by alkyl hydroperoxides is known, but not utilized for complex molecule synthesis. The use of fine mineral matter based catalyst might offer a more effective and affordable approach.

Conversion of syngas to methanol: proposed catalyst could also provide further optimization of the catalytic synthesis of methanol from syngas, the most popular method of current industrial production of methanol. Current catalysts for the catalytic conversion of syngas to methanol are based on $ZnO/Al_2O_3$(BASF process) or $Cu/ZnO/Al_2O_3$(ICI process), Conversion of methanol to gasoline (MTG): the methanol to gasoline synthesis, developed by Mobil Oil Corporation converts methanol catalytically to hydrocarbons over a zeolite catalyst ($NaAlSi_2O_6$—$H_2O$) at 350° C. and pressures about 30 atm. The similar "coal to gasoline" process was developed in China by Jincheng Anthracite Mining Group.

Conversion of methanol to olefins (MTO): the MTO process converts methanol into light olefins. Unlike the steam cracking, the yield of propylene over ethylene is more flexible, which is a strong positive vs steam cracking. The process currently requires higher temperatures than the MTG, but at near atmospheric pressure.

In some embodiments, combinations of techniques could be also used, e.g. a liquefaction step and an entrained or fixed or fluidized bed gasifier. In the liquefaction step, the plastic waste can be mildly thermally cracked (depolymerized) into synthetic heavy oil and some condensable and non-condensable gas fractions. The non-condensable gases can be reused in the liquefaction as fuel (together with natural gas). Oil and condensed gas can be injected to the gasifier, where the gasification is carried out with oxygen and steam. After a number of cleaning processes, which can include HCl and HF removal, among others, a clean and dry synthetic gas, consisting predominantly of CO and $H_2$, with smaller amounts of $CH_4$, $CO_2$, $H_2O$ and some inert gases is produced. Typical gasification is conducted at a temperature range of approximately 1200° C. to 1500° C., though one skilled in the art will recognize that higher or lower temperatures can be applied to promote gasification, which is essentially the Texaco process as described above. It will be appreciated that the Texaco process requires maintenance of a high temperature to promote conversion.

Figure 1:
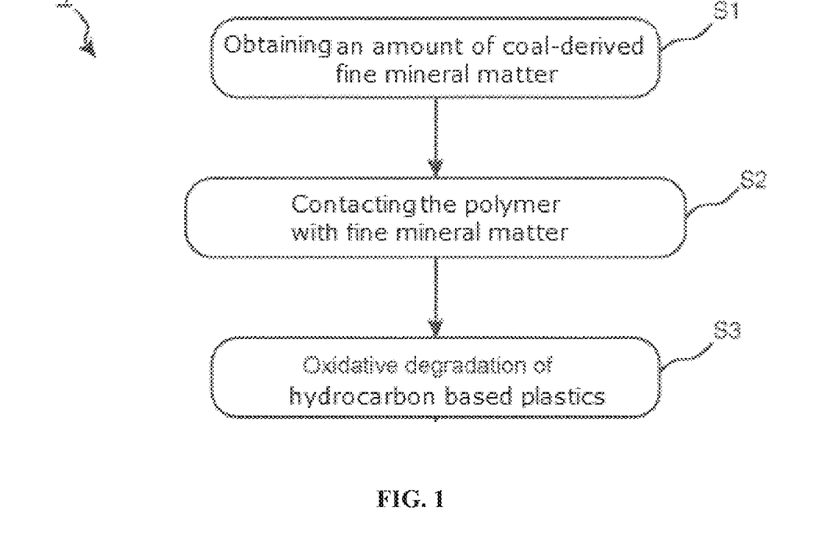
FIG. 1 represents a flow diagram illustrating the method of recycling of the hydrocarbon plastic according to the presently disclosed embodiments.

The method of chemical recycling begins with S1 where an amount of fine mineral matter, which can be used as a catalyst, is obtained. The fine mineral matter is separated from the coal refuse and/or fine-size coal with the froth flotation separation process described above. The fine mineral matter could also be mined from natural sources, such as volcanic basalt, glacial rock dust deposits, iron potassium silicate and other sea shore mined deposits. The particle size of the fine mineral matter ranges from less than about 50 μm to about 2 μm. The fine mineral matter comprises at least one and more preferably at least two transition metals selected from the group consisting of Fe, Cu, Mn, Mo, Zn, Co, or combinations thereof to cause the oxidative degradation of the non-biodegradable plastic. These transition metals in the fine mineral matter have concentrations measured with ICP-AES method utilizing nitric acid, hydrochloric acid and hydrogen peroxide in a heated digester and are defined in the range shown in Table 3 above.

In some embodiments, heating can be conducted at a temperature in a range from about 200 degrees Celsius to about 500 degrees Celsius.

The fine mineral matter further comprises Ca, K, Mg or combinations thereof, to promote the oxidative degradation of the plastic.

In step S2, the fine mineral matter contacts the molten polymer or the vapors of the polymer that are formed during cracking. Contact with the fine mineral matter can occur at the cracking or gasification temperatures in the presence of oxygen and/or steam, and production of syngas rich in $H_2$ and CO with smaller amounts of $CH_4$, $CO_2$, $H_2O$ and some inert gases.

In step S3, the transition metals in the fine mineral matter catalyze oxidative degradation. For hydrocarbon-based polymers sensitive to radical chain processes, the rate-determining part of the degradation process is the oxidation segment, commonly called peroxidation. Hydrocarbon polymers vary in their ability to resist (or undergo) peroxidation. Thus, the oxidative stability increases from natural rubber (cis-poly(isoprene)) to poly(butylene) to polypropylene to polyethylene to polyvinyl chloride. Within polyethylenes, due to their chemical and morphological characteristics, LDPE and LLDPE are more susceptible to oxidative degradation than HDPE.

Experimental Data

The samples of linear low density polyethylene (LLDPE) and LLDPE modified with the presently disclosed catalyst were tested with TA Instruments Discovery thermogravimetric analysis (TGA) analyzer at the rates of 5, 10, 15 and 20° C./min from 50° C. to 550° C. in air. The activation energies of degradation were calculated by the Kissinger method:

$$\beta E_a/RT_m^2 = An(1-\alpha)_m^{n-1} e^{-E_a/(RT_m)},$$

where $\alpha$ is the conversion, $E_a$ is the apparent activation energy, kJ/mol, A is the pre-exponential factor; $\beta$ is the heating rate, ° C./min R is the general gas constant, J/mol ° K, $T_m$ is the temperature at maximum degradation rate, ° K, and n is the reaction order. The Kissinger method has shown that the product $n(1-\alpha)_m^{n-1}$ equals 1 and is independent of the heating rate. Rewritten as $\ln(\beta^* E_a/RT_m^2) = -E_a/RT_m$ it could be seen that dependence of $\ln(\beta/T_m^2)$ versus $(1/RT_m)$ represents a straight line. Apparent activation energy is calculated from the slope and the pre-exponential factor from the intercept of the straight line on the y-axis.

Figure 2:
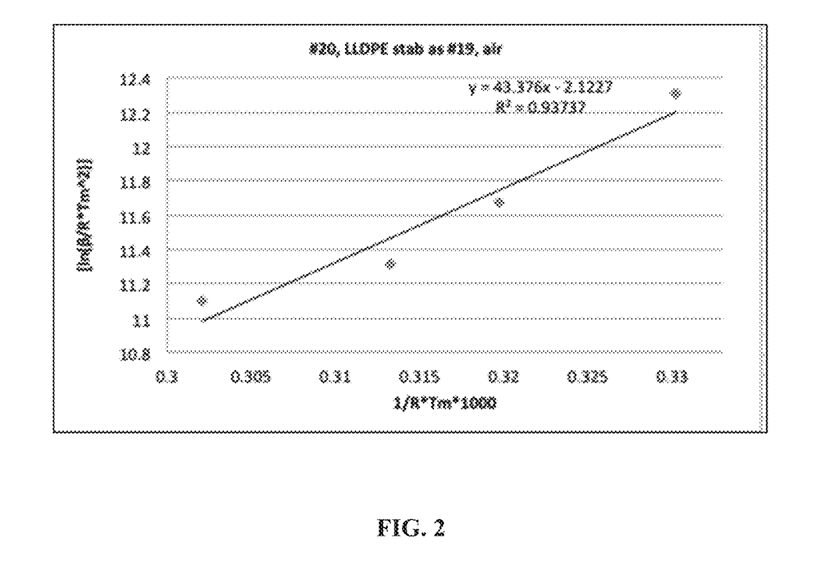
FIG. 2 illustrates a graph of stabilized linear low density polyethylene (LLDPE) degradation in air according to an embodiment of the presently disclosed embodiments.
Figure 3:
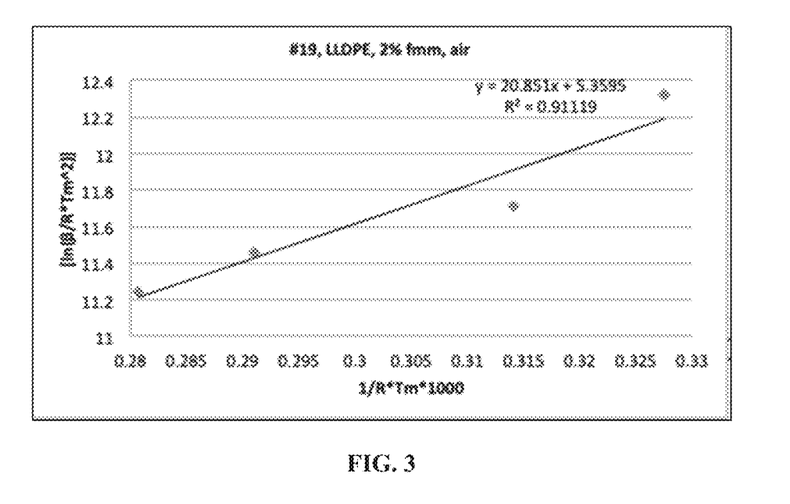
FIG. 3 illustrates a graph of modified LLDPE degradation in air according to an embodiment of the presently disclosed embodiments.
Figure 4:
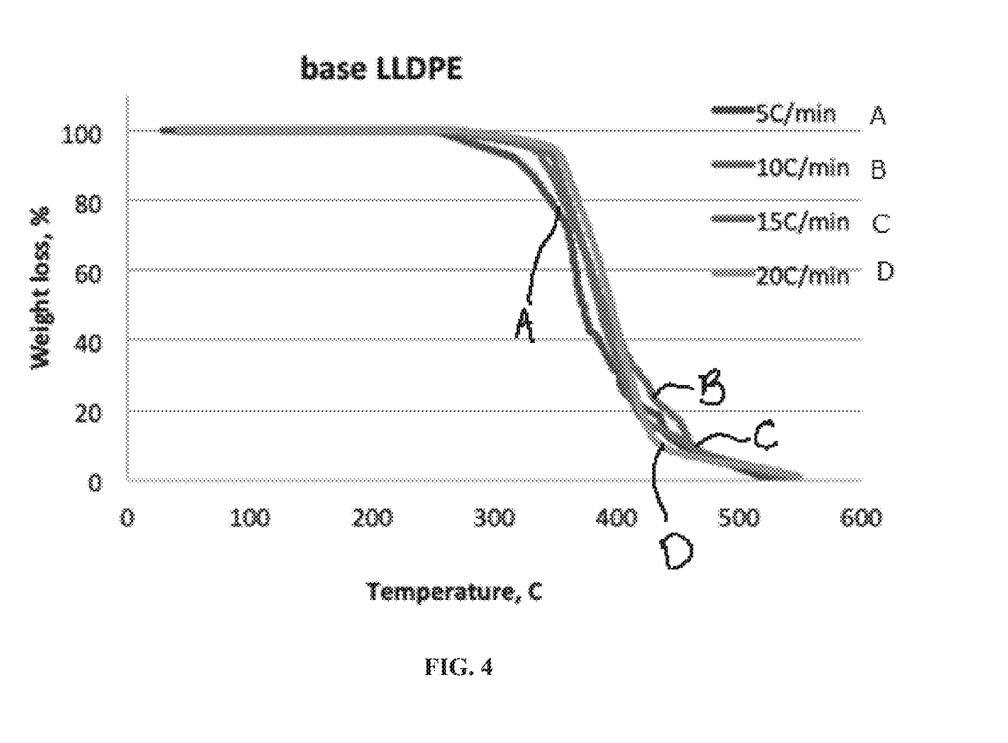
FIG. 4 illustrates a graph of base LLDPE weight changes at different rates according to an embodiment of the presently disclosed embodiments.
Figure 5:
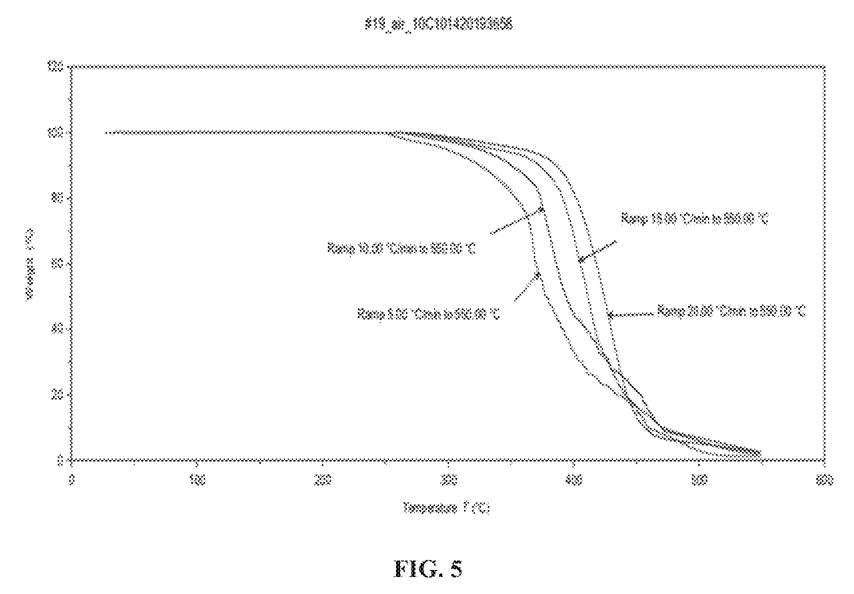
FIG. 5 illustrates a graph of modified LLDPE weight changes at different rates according to an embodiment of the presently disclosed embodiments.

FIGS. 2-5 illustrate the effect that addition of the catalyst can have on LLDPE. As shown in FIG. 2, the $E_a$ of degradation of the base LLDPE compound in air is 43.4 kJ/mol. The base LLDPE compound also contains 0.2% of primary phenolic antioxidant, and 0.13% of benzotriazol based UV absorber. Addition of the catalyst to the base LLDPE compound reduces the $E_a$ to 20.85 kJ/mol, as shown in FIG. 3. Therefore, inclusion of the catalyst results in approximately a 50% or more reduction in the activation energy, $E_a$, in degradation needed in the absence of the catalyst. A person skilled in the art will recognize that "f m" in the figures refers to "fine mineral matter." The TGA data for the base LLDPE and modified LLDPE samples used in the above $E_a$ calculations are shown in FIGS. 4 and 5. As shown in FIG. 4 for the base LLDPE, degradation is shown at 5 C/min (A), 1OC/min (B), 15 C/min (C), and 20 C/min (D).

For degradations conducted in nitrogen, the activation energies of the base LLDPE and modified LLDPE are 107.83 and 156.44 kJ/mol, respectively. These values suggest that the fine mineral matter is catalyzing the oxidative processes and the chemical recycling techniques involving oxidation should be considered. Some non-limiting examples of such techniques could be gasification, thermal or catalytic cracking conducted in the presence of oxygen or in other oxidative environment.

In some embodiments, when an LDPE compound is tested by TGA, which has different stabilization chemistry, the reduction of the activation energy in the compound modified with fine mineral matter was also demonstrated—a reduction from 51.6 to 45.7 kJ/mol with only 0.5% of the fine mineral matter used.

The summary table of TGA data of thermal degradation of LDPE and LLDPE for a variety of materials is presented in Table 5 below.

TABLE 5

| Polymer | Gas | Eact, kJ/mol | A | Rsq | Heating rate, C./min | T onset, C. | dW/dT, Tmax, C. | T at 20% loss |
|---|---|---|---|---|---|---|---|---|
| LLDPE, #20, stabilized with 0.2% Irganox 1010 and 0.13% Tin 326 | N2 | 107.83 | 14.54 | 1 | 5 | 453.7 | 474.11 | 453.7 |
|  |  |  |  |  | 10 | 463.87 | 484.3 | 464.6 |
|  |  |  |  |  | 15 | 475.58 | 492.3 | 476.6 |
|  |  |  |  |  | 20 | 480.3 | 497.17 | 482.1 |
| LLDPE, #19 (as #20 + 2% FMM) | N2 | 156.44 | 26.97 | 0.93 | 5 | 456.3 | 474.7 | 457.6 |
|  |  |  |  |  | 10 | 451.36 | 478.5 | 449.2 |
|  |  |  |  |  | 15 | 469.54 | 486 | 471.18 |
|  |  |  |  |  | 20 | 472.1 | 489.66 | 474.3 |
| LLDPE, #20, stabilized with 0.2% Irganox 1010 and 0.13% Tin 326 | air | 43.38 | 2.12 | 0.93 | 5 | 346.1 | 364.4 | 345.3 |
|  |  |  |  |  | 10 | 338.8 | 376.4 | 356 |
|  |  |  |  |  | 15 | 347.01 | 384.16 | 359.8 |
|  |  |  |  |  | 20 | 357.66 | 398.39 | 367.4 |
| LLDPE, #19 (as #20 + 2% FMM) | air | 20.85 | 5.25 | 0.91 | 5 | 349.08 | 367.38 | 354 |
|  |  |  |  |  | 10 | 361.15 | 383.15 | 373.3 |
|  |  |  |  |  | 15 | 382.45 | 413.59 | 391.2 |
|  |  |  |  |  | 20 | 395.86 | 428.63 | 402 |
| LDPE, #21 (as #20, LDPE resin) | air | 51.55 | 5.4 | 0.96 | 5 | 329.86 | 350.6 | 331.6 |
|  |  |  |  |  | 10 | 330.1 | 367.1 | 343.1 |
|  |  |  |  |  | 15 | 336.4 | 370.7 | 348.4 |
|  |  |  |  |  | 20 | 351.19 | 376.9 | 359.78 |
| LDPE, #7 (as #21, +0.5% FMM) | air | 45.69 | 3.35 | 1 | 5 | 306.5 | 352.6 | 320 |
|  |  |  |  |  | 10 | 343.95 | 367 | 348 |
|  |  |  |  |  | 15 | 333 | 376 | 349.79 |
|  |  |  |  |  | 20 | 331.7 | 382.6 | 349 |

One skilled in the art will appreciate further features and advantages of the disclosure based on the above-described embodiments. Accordingly, the disclosure is not to be limited by what has been particularly shown and described, except as indicated by the appended claims. All publications and references cited herein are expressly incorporated herein by reference in their entirety.

The invention claimed is:

1. A method of chemical recycling, the method comprising:
   obtaining an amount of catalytic fine mineral matter that is separated from coal and/or mined from natural resources including volcanic basalt, glacial rock dust deposits, iron potassium silicate and/or sea shore deposits, the catalytic fine mineral matter having particle sizes between approximately 0.5 µm to approximately 20 µm inclusive, the catalytic fine mineral matter being free from coal; and
   contacting a molten polymer or its vapors with the catalytic fine mineral matter at a cracking or gasification temperature in the presence of oxygen and/or steam to form a syngas product, the molten polymer or its vapors being converted into smaller molecules after contact with the fine mineral matter, the smaller molecules include one or more of $H_2$, CO, $CH_4$, $CO_2$, $H_2O$, and inert gases, wherein the catalytic fine mineral matter comprises the following transition metals at the following concentrations:
   Fe 14,000 to 45,000 ppm;
   Cu 10 to 50 ppm;
   Mn 100 to 700 ppm;
   Mo 0 to 2 ppm;
   Zn 20 to 120 ppm; and
   Co 0 to 5 ppm.

2. The method according to claim 1, wherein ppm are measured with ICP-AES method utilizing nitric acid, hydrochloric acid and hydrogen peroxide in a heated digester.

3. The method according to claim 1, wherein the catalytic fine mineral matter comprises an alkali and alkaline earth metals Ca, K, Na, Mg or combinations thereof at the following concentrations:
   Ca 1,000 to 18,000 ppm;
   K 600 to 4,000 ppm;
   Na 300 to 1,500 ppm; and
   Mg 20 to 8,000 ppm.

4. The method according to claim 1, wherein the concentration of the catalytic fine mineral matter is between 0.5 and 8 volume % or at a catalyst/feedstock ratio in a range of about 1:5 to about 1:100 wt %.

5. The method according to claim 1, wherein the catalytic fine mineral matter is utilized as either a support material or the catalyst.

6. The method according to claim 1, wherein the molten polymer is produced by a catalytic process of post industrial or post-consumer plastic waste, of solid mixed plastic waste, or of petrochemical heavy oils and alkanes by steam cracking, gasification and reforming processes.

7. The method according to claim 6, wherein liquefaction precedes gasification, liquefaction being achieved via pyrolysis, thermal cracking, or steam cracking to convert plastic waste into synthetic heavy oil and condensable gases that are injected onto a gasifier and/or a steam reformer.

8. The method according to claim 6, further comprising cleaning and/or hydrogenation following gasification to improve the composition of the syngas product.

9. The method according to claim 6, further comprising subjecting the syngas to one or more of a KDV process, a Texaco process, or processes utilizing single or dual bed fluidized, fixed and entrained flow reactors.

10. The method according to claim 6, wherein the steam cracking includes aquathermolysis in supercritical water.

11. The method according to claim 6, where the reforming process includes catalytic steam reforming of methane to the syngas product.

12. The method according to claim 1, further comprising electrifying the syngas product.

13. The method according to claim 1, further comprising:
    powering the steam cracking or gasification using the syngas product as a heat source.

14. The method according to claim 1, further comprising using the syngas product as a gas source to support hydrocracking.

15. The method according to claim 1, where wherein:
    the steam cracking is catalytic steam cracking; and
    the catalytic steam cracking is in a continuous flow mode in a slurry type reactor.

16. The method according to claim 1, wherein the particle size ranges from between approximately 5 microns and approximately 2 microns.

17. The method according to claim 13, wherein the heating is conducted at a temperature in a range from about 200 degrees Celsius to about 500 degrees Celsius.

18. The method according to claim 1, wherein the catalytic fine mineral matter accelerates a chain scission or an oxidative conversion of the molten polymer or its vapors.

* * * * *